Nov. 14, 1972  H. OBERTHUR  3,702,713
ANTI-SKID CONTROL DEVICE

Filed June 30, 1971  3 Sheets-Sheet 3

Inventor
HEINRICH OBERTHUR

By Alfred C. Hill
Agent

United States Patent Office 3,702,713
Patented Nov. 14, 1972

3,702,713
ANTI-SKID CONTROL DEVICE
Heinrich Oberthur, Offenbach-Rumpenheim, Germany, assignor to ITT Industries, Inc., New York, N.Y.
Filed June 30, 1971, Ser. No. 158,345
Claims priority, application Germany, Sept. 16, 1970,
P 20 45 689.7
Int. Cl. B60t 8/02
U.S. Cl. 303—21 F    13 Claims

ABSTRACT OF THE DISCLOSURE

An electrically controlled anti-skid control device for a two-circuit brake system is disclosed. The space requirement for such a device is reduced due to its construction because both brake circuits employ in common only one volume expansion device and one hydraulic pressure accumulator. The volume expansion device includes one floating piston separating the two brake circuits from each other, an actuating piston, and a separating piston to separate the two brake circuits from the accumulator pressure controlling the actuating piston and the separating valves disposed in each of the two brake circuits. Due to the construction of the volume expansion device, the volume expansion is always linearly related to a wheel locking control signal. Thus, no subpressure and no pressure peaks will occur in the two brake circuits. The strongly pre-stressed return spring of the prior art is omitted, the movement of the floating, actuating and separating pistons being hydraulically controlled in both directions.

BACKGROUND OF THE INVENTION

The invention relates to an electrically controlled anti-skid control device for vehicles with two-circuit brake systems where, in dependence on a wheel locking control value detected by a suitable sensor, the hydraulic connection line between the wheel brake cylinder and the master cylinder is interrupted by a separating valve and where the brake medium in the section of the hydraulic line which is in communication with the wheel cylinder is relieved by means of volume expansion during the controlled movement of a piston.

In a known embodiment of an anti-skid control device based on this principle, the movement of the piston effecting the volume expansion is mechanically coupled with the movement of the separating valve. By means of controlled pressure acting on a rolling diaphragm, connected with the piston, said piston is moved against the high pre-stress force of a spring which is supporting itself, on one hand, on the rolling diaphragm and, on the other hand, on the bottom of the housing, said spring also generating the force which causes the piston to return to its normal position.

The assembly of springs with such pre-stress is always disadvantageous. In the described example the spring needs a pre-stress which surpasses the force of the brake pressure acting on the front surface of the piston. Furthermore, when designing the spring attention has to be paid to the fact that the spring more or less will be used only in the linear range of its spring characteristic, or else the volume expansion in the brake circuit ceases to be analogous to the control value. Due to the mechanic coupling of the piston with the separating valve, upon actuation of the system, additional pressure medium from the brake circuit is sucked off through the separating valve, said action, on one hand, leading to a subpressure and consequently to a foaming-out of the pressure medium in the brake line and, on the other hand, to a peak pressure in the brake circuit when the piston is returning into its starting position resulting in the brakes being applied abruptly.

With two-circuit brake systems, in addition, it is necessary to provide a complete control unit consisting of separating valve, separating piston and electromagnetic switching-off valves or locking valve, respectively, for both brake circuits. Therefore, the whole anti-skid control device occupies a lot of valuable constructional space and its design is quite complicated resulting in increased cost.

SUMMARY OF THE INVENTION

An object of the present invention is to provide a space-saving, reliably working and inexpensive anti-skid control device for two-circuit brake systems which is free from the afore-mentioned disadvantages.

A feature of the present invention is the provision of an electrically controlled anti-skid control device for vehicles with two-circuit brake systems comprising: two brake circuits; a master cylinder coupled to both of the two brake circuits; two normally open separating valves each coupled between a different one of the two brake circuits and the master cylinder, each of the separating valves having a first actuating surface; a pressure medium accumulator; a pressure medium return line; a volume expansion device including a first portion permanently connected to each of the two brake circuits, but maintaining each of the two brake circuits independent of each other, a second portion is coupled relation with the first portion and directly connected to the return line, and a third portion in coupled relation with the second portion and directly connected to the accumulator; a first normally closed electromagnetic valve connected between the accumulator and both the second portion and the first actuating surface of each of the separating valves; and a second normally open electromagnetic valve connected between the return line and both the second portion and the first actuating surface of each of the separating valves; both the first and second electromagnetic valve being actuated by a wheel locking control signal to their other position to enable actuation of the second portion and the first actuating surface of each of the separating valves by the pressure from the accumulator to close each of the separating valves, to move the second and third portions against the pressure of the accumulator and to enable the first portion to provide volume expansion of the hydraulic fluid in each of the two brake circuits; the first, second and third portions returning to their normal conditions solely due to the pressure of the accumulator acting in the third portion when the wheel locking control signal disappears.

Another feature of the present invention is the provision of the volume expansion device of the above defined anti-skid control device including a cylindrical bore closed at both ends, the bore having a first length extending from one of the ends of the bore with a given diameter, a second length connected to the first length with a diameter greater than the given diameter and a third length connected to the second length extending to the other end of the bore with a diameter substantially equal to the given diameter, a cylindrical floating piston having a length shorter than the first length, a central portion slidably sealed to the inner surface of the first length, a first reduced diameter portion connected to one end of the central portion adjacent the one end of the bore and a second reduced diameter portion connected to the other end of the central portion, a cylindrical separating piston having a first cylindrical portion slidably sealed to the inner surface of the first length with one end thereof normally in contact with the adjacent end of the second reduced diameter portion and a second cylindrical portion slidably sealed to the inner surface of the second length, the second cylindrical portion being spaced from the end of the first length connected to the second length and the end of the second length connected to the third length, and a cylindrical actuating piston having a diameter equal to the diameter of the third length slidably sealed to the inner surface of the third length extending from said second cylindrical portion to a point in the third length spaced from the other end of the bore, the first portion includes the floating piston, a first annual chamber formed by the first reduced diameter portion, the one end of the bore and the bore of a first part of the first length and a second annular chamber formed by the second reduced diameter portion, the one end of the first cylindrical portion and a second part of the first length, the second portion includes the separating piston and a third annular chamber formed by the end of the first length connected to the second length, the second cylindrical portion and the associated bore of the second length, and the third portion includes the actuating piston, a fourth annular chamber formed by the end of the second length connected to the third length, the part of the actuating piston in the second length, the end of the second cylindrical portion in contact with the actuating piston and the associated bore of the second length, and an actuating chamber formed by the other end of the bore, the end of the actuating piston adjacent the other end of the bore and the associated bore of the third length.

In a preferred embodiment the separating piston includes a sleeve slidably sealed in the second length of the cylindrical bore and a core piece slid into the sleeve and sealed off against the inside wall of the sleeve and against the wall of the first length of the cylindrical bore which is in communication with the second annular chamber connected to one of the two brake circuits.

BRIEF DESCRIPTION OF THE DRAWING

Above-mentioned and other features and objects of this invention will become more apparent by reference to the following description taken in conjunction with the accompanying drawing in which.

DESCRIPTION OF THE PREFERRED EMBODIMENTS

Figure 1:
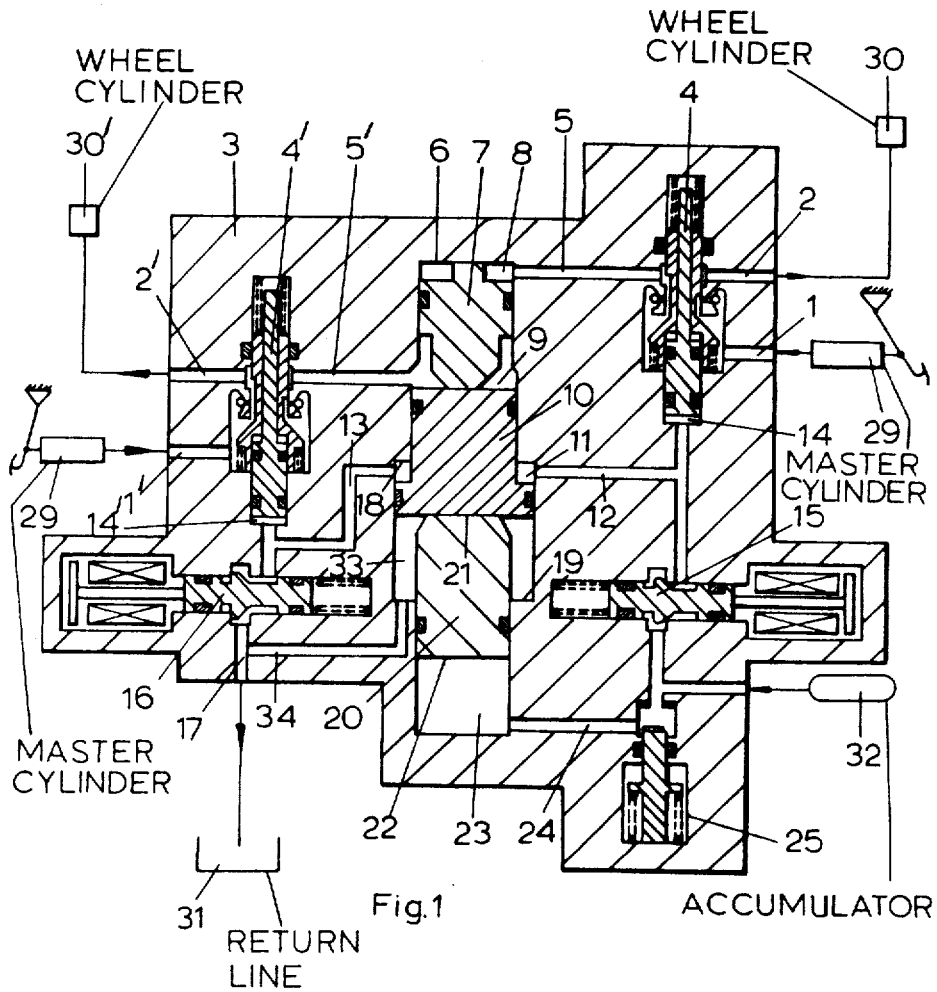
FIG. 1 shows a section through the anti-skid control device in accordance with the principles of the present invention in the rest position.
Figure 2:
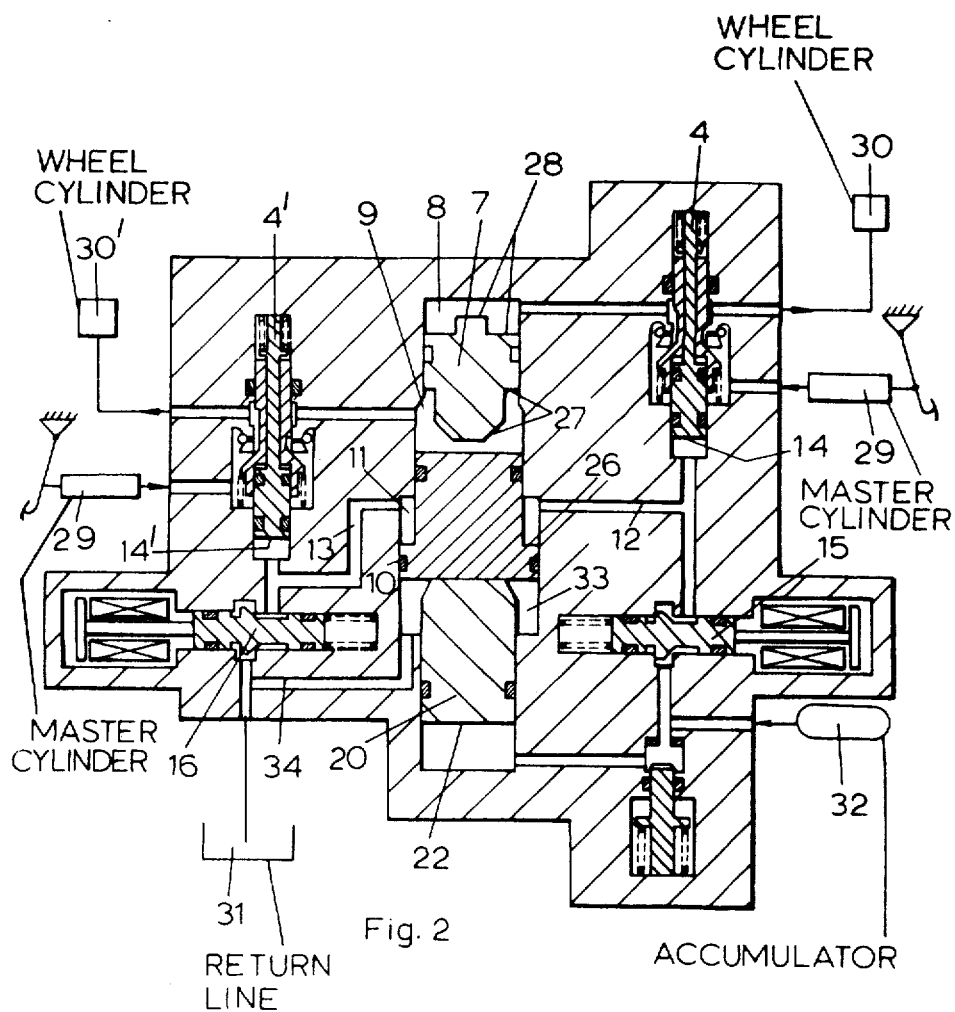
FIG. 2 shows a section of the anti-skid control device of FIG. 1 in the control position.

Referring to FIGS. 1 and 2, pressure medium ducts 1 and 1' at the output of master cylinder 29 and pressure medium ducts 2 and 2' of the two brake circuits leading to the wheel brake cylinders 30 and 30' are connected with each other in the housing 3 by means of separating valves 4 and 4', which in the rest position of the system are open. It should be noted that although master cylinder 29 is illustrated twice in FIGS. 1 and 2, this illustration is only for convenience of illustrating the connections between a single master cylinder 29 and the two brake circuits. Pressure medium ducts 5 and 5' are connected to ducts 2 and 2' in any position of separating valves 4 and 4'. Ducts 5 and 5' are connected into a cylindrical bore 6 in which floating piston 7 is disposed, said floating piston 7 being sealed off against the inner wall of bore 6 (the first length of bore 6) and hydraulically separating the two brake circuits from each other. Floating piston 7 is stepped as illustrated such that two chambers 8, 9 are formed in bore 6, each one of which is coupled to a different one of brake circuits, each one of which is sealed off with respect to each other and each one of which may change in size and form. In the rest position of the system shown in FIG. 1 floating piston 7 rests on separating piston 10 which is formed as a stepped piston and which is slidably sealed and guided in the prolonged and equally stepped portion of bore 6 (the second length of bore 6). Due to this step of bore 6 and the corresponding step of separating piston 10 an annular chamber 11 is formed which is sealed off against the rest of bore 6 and from where branching-off pressure medium ducts 12 and 13 lead, on one hand, to the actuating surfaces 14 and 14' of separating valves 4 and 4' which are to be actuated hydraulically and, on the other hand, into the valve chamber of the two electromagnetic valves 15 and 16. Valve 16 which is open in the rest position of the system is connected in pressure medium line 17 which leads to return line 31, said valve 16 connecting annular chamber 11 and the actuating surfaces of separating valves 4 and 4' with the return line. Valve 15 is closed in the rest position of the system and separates annular chamber 11 and the actuating surfaces of the two separating valves 4 and 4' from accumulator 32. Bore 6 whose diameter is enlarged by step 18 is narrowed by a second step 19 to preferably the original diameter (the third length of bore 6). In this third length of bore 6, actuating piston 20 is slidably sealed and guided. Piston 20 projects into the enlarged section (the second length of bore 6) and its front surface 21 abuts against the surface of separating piston 10 which is facing actuating piston 20. Separating piston 10 and actuating piston 20 may be just as well formed as a one piece stepped piston. Actuating surface 22 of actuating piston 20 defines chamber 23 of bore 6 which is permanently connected with accumulator 32 by means of pressure medium duct 24. Annular chamber 33 which is formed by the enlarged bore 6 and the projection of actuating piston 20 into this length of bore 6 is directly connected with return line 31 by means of pressure medium duct 34. In pressure medium duct 24 from accumulator 32 to chamber 23 non-return device 25 is connected, which upon failure of the accumulator pressure and, thus, of the control system, guarantees the operation of the brake system.

The operation of the system is as follows:

In the rest position of the anti-skid control device according to the present invention, electromagnetic valve 15 is closed and separates the accumulator pressure from annular chamber 11 and the actuating surface 14 and 14' of separating valves 4 and 4' which are in communication with annular chamber 11. Electromagnetic valve 16 is open and connects annular chamber 11 as well as the pressure medium ducts which lead from annular chamber 11 to the actuating surfaces 14 and 14' of separating valves 4 and 4' with return line 31. Separating valves 4 and 4' then are in their rest position, i.e. they are open. This provides communication between master cylinder 29 and the wheel brake cylinder in both brake circuits. As a result of the accumulator pressure acting on the actuating surface 22 of actuating piston 20, floating piston 7, separating piston 10 and actuating piston 20 are in their starting positions, i.e. they abut against each other and against the upper end of bore 6 as shown in FIG. 1. Upon actuation of the brake pedal by the driver brake pressure will build up in both brake circuits, from master cylinder 29 through separating valves 4 and 4' into the wheel cylinders. Floating piston 7 hydraulically separating the brake circuits from each other is pressure-compensated as the pressure in chambers 8, 9 is the same, said chambers 8, 9 being in communication with the brake circuits, and since the bilateral actuating surfaces of floating piston 7 are the same in size. If during the braking procedure one of the wheel locking sensors (not shown) disposed at the vehicle wheels states that the respective wheel tends to lock, the electronic unit (not shown) will emit a signal which will actuate the two electromagnetic valves 16 and 15 (FIG. 2). Valve 16 closes and separates annular chamber 11 and actuating surfaces 14 and 14' of separating valves 4 and 4' connected with annular chamber 11 via pressure medium ducts 12 and 13 from return line 31. Simultaneously valve 15 opens and the accumulator pressure now can proceed into annular chamber 11 and up to actuating surfaces 14 and 14' of separating valves 4 and 4'. Both separating valves 4 and 4' are closed under the effect of the accumulator pressure, thereby separating the pressure medium connection of both brake circuits between the master cylinder and the wheel brake cylinders. Since annular surface 26 in annular chamber 11, which is formed by the step at separating piston 10, is larger than the actuating surface 22 of actuating piston 20, separating piston 10 and actuating piston 20 are moved by the accumulator pressure acting on the annular surface 26 against the accumulator pressure acting on actuating surface 22. The pressure medium in annular chamber 33 partly is pressed into return line 31. Thus, chamber 9 at first is expanding, said chamber 9 being in communication with one brake circuit and containing one actuating surface 27 of floating piston 7. The pressure in chamber 9 and the pressure in the portion of one of the brake circuits connected to chamber 9 leading to the wheel brake cylinder is sinking. Due to the resulting pressure difference on the actuating surfaces 27 and 28 of floating piston 7, said floating piston 7 will move. This results in chamber 8 connected with the other brake circuit also expanding until floating piston 7 is pressure-compensated anew. Thus, the brake pressure in the section of both brake circuits which is connected with the wheel brake cylinders 30 and 30' are evenly reduced. The vehicle wheels will regain their speed. Since the danger of wheel locking being eliminated, the signal of the wheel locking sensor will disappear. The excitation current of both electromagnetic valves 15 and 16 is thusly cut off and valves 15 and 16 return to their starting positions. Valve 15 is closed and will again separate annular chamber 11 and the actuating surfaces 14 and 14' of separating valves 4 and 4' from accumulator 32, while valve 16 will open and connect annular chamber 11 as well as actuating surfaces 14 and 14' of separating valves 4 nd 4' with return line 31. As a result of the decreasing pressure acting on actuating surfaces 14 and 14' and in annular chamber 11, on one hand, separating valves 4 and 4' are opened reconnecting master cylinders 29 with wheel brake cylinders 30 and 30', and, on the other hand, actuating piston 20, separating piston 10 and floating piston 7 are brought back into their starting positions by means of the accumulator pressure constantly acting on actuating surface 22. A new braking procedure and a new control cycle can start.

The above-described system, however, has a disadvantage, if such a device is to be furnished with a means for determining, before starting the vehicle, the faultless operation of the control system. For this purpose, valves 15 and 16 of the system, e.g., are coupled with the ignition and actuated without a braking being effected. Actuating piston 20 and separating piston 10 then will leave their rest position, a brake pressure not being built up in the brake circuits. Due to the resulting volume expansion in chambers 8 and 9 of the brake circuits a subpressure would be generated in the system of FIGS. 1 and 2, said subpressure causing the pressure medium to foam out.

Figure 3:
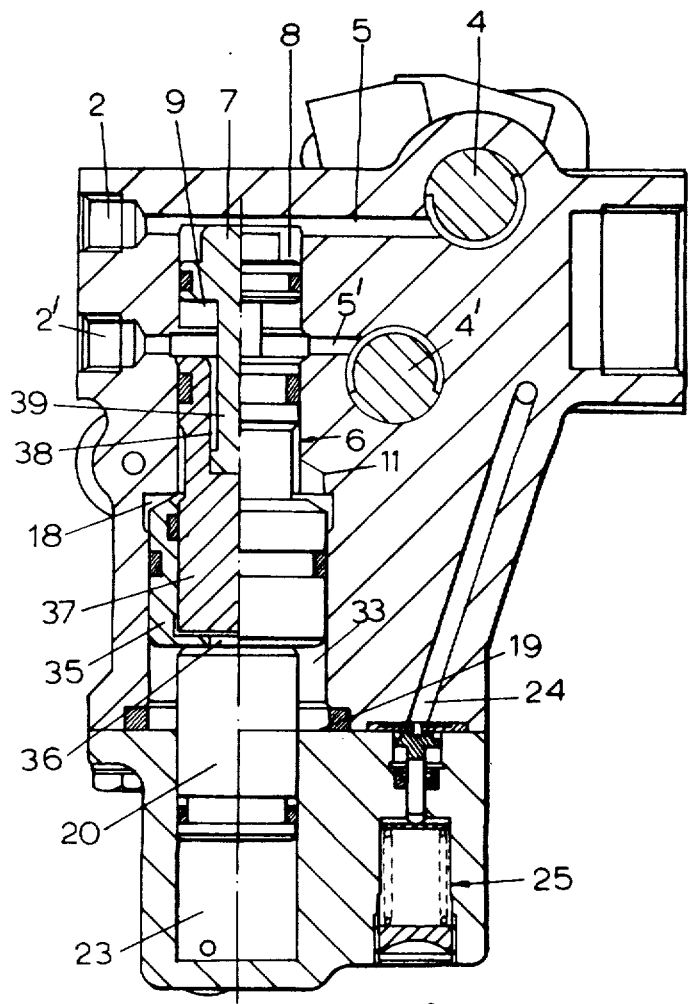
FIG. 3 shows a special embodiment of the piston unit.

This disadvantage is avoided with an embodiment of the piston unit illustrated in FIG. 3. The separating piston seated on actuating piston 20 is bipartite and consists of sleeve 35 sealed off against the wall of bore 6 enlarged by steps 18 and 19 (second length of bore 6), said sleeve 35 being provided with a bottom or transverse portion having an aperture 36 therein. Said bottom rests on the radially smaller actuating piston 20. Core 37 of the separating piston is slid into the sleeve 35 and projects into the narrowed part (first length) of bore 6, said core 37 being sealed off against both the wall of bore 6 and the interior wall of sleeve 35. At its surface facing the brake circuits it is provided with pocket bore 38 into which projection 39 of floating piston 7 is protruding, said floating piston 7 sealingly separating chambers 8 and 9 of bore 6 which are connected to the two brake circuits. Floating piston 7 is guided by its projection 39 in the separating piston such that in spite of the limited height of floating piston 7 tilting is avoided when floating piston 7 is moving. From chambers 8 and 9 of floating piston 7 pressure medium ducts lead, on one hand, to the wheel brake cylinders and, on the other hand, to separating valves 4 and 4'. The operation is the one already described with respect to FIGS. 1 and 2. The pressure of the accumulator permanently being in chamber 23 actuates actuating piston 20. Annular chamber 33 encircling actuating piston 20 which is projecting into the enlarged bore 6 is always in communication with return line 31. Annular chamber 11 containing the annular surface of sleeve 35 is to be alternately connected with return line 31 or accumulator 32. The pressure of one of the brake circuits actuates the actuating surface of separating piston sleeve 35 or core 37 of the separating piston, respectively, said actuating surfaces facing said one of the brake circuits. In addition the pressure of said one of the brake circuits actuates one of the actuating surfaces of floating piston 7, while the other actuating surface of the floating piston is under the pressure of the second brake circuit. If there is a controlling action to be effected during a braking procedure, annular chamber 11 will be connected with the accumulator in the above-described way. Sleeve 35 and actuating piston 20 move against the accumulator pressure in chamber 23, while the core 37 of the separating piston under the pressure in the brake circuit is following this movement to an extent which is proportionate to said pressure, this action resulting in a displacement also pressure-proportionate of floating piston 7. Thus, the brake pressure in the sections of the brake circuits previously separated from the master cylinder by means of the separating valves 4 and 4' is reduced until the danger of wheel locking is passed and the entire system returns into its rest position.

When inspecting the operational capacity of the system before the start of the vehicle now accumulator pressure is introduced into annular chamber 11 for a short time without the occurrence of a subpressure in the brake circuits. In the embodiment of the separating piston according to FIG. 3 only sleeve 35 is moving together with actuating piston 20 against the accumulator pressure of chamber 23. From annular chamber 33 permanently in communication with the return line relieved pressure medium may flow through the leak part between the sleeve bottom and the actuating piston and, hence, through aperture 36, the resulting intermediate chamber between sleeve 35 and core 37 being filled. Core 37 of the separating piston and floating piston 7 remain pressure-compensated in their starting positions. Since the extent of the movement of these two parts which determine the volume expansion is independent of the accumulator control pressure fed into annular chamber 11, but is rather determined by the pressure in the brake circuits, it is impossible that a subpressure will develop. Thus, there is no longer need to use only special oils as brake fluid which will not foam.

In the present invention there is no need for a strongly pre-stressed returning spring for the constructional element which effects the volume expansion in the brake circuit. Due to the mechanical separation of the separating valves and of the pistons of the volume expansion device the volume expansion is always analogously to the control signal, thus, no subpressure develops in the brake lines and no pressure peak occurs upon the return of the pistons of the volume expansion device.

A special advantage as compared with known anti-skid control devices for two-circuit brake systems is to be seen in the reduced constructional space required. Only a separating valve is separately provided for each brake circuit. The electromagnetic valves and the unit expanding the volume in the brake circuits jointly supply both brake circuits.

A further advantage lies in the considerable saving of energy in the control circuit supplied by the accumulator. As a result of the fact that chamber 23, annular chamber 11 and accumulator 32 are connected with each other during the control procedure the major part of the pressure medium displaced by the control movement does not flow into return line 31 but returns into the accumulator 32 such that the supply pump of the accumulator is utilized to a lesser extent than in conventional systems where the amount of pressure medium fed for the purpose of control subsequently flows into the return line.

While I have described above the principles of my invention in connection with specific apparatus it is to be more clearly understood that this description is made only by way of example and not as a limitation to the scope of my invention as set forth in the objects thereof and in the accompanying claims.

I claim:

1. An electrically controlled anti-skid control device for vehicles with two-circuit brake systems comprising:
   two brake circuits;
   a master cylinder coupled to both of said two brake circuits;
   two normally open separating valves each coupled between a different one of said two brake circuits and said master cylinder, each of said separating valves having a first actuating surface;
   a pressure medium accumulator;
   a pressure medium return line;
   a volume expansion device including
      a first portion permanently connected to each of said two brake circuits, but maintaining each of said two brake circuits independent of each other,
      a second portion in coupled relation with said first portion and directly connected to said return line, and
      a third portion in coupled relation with said second portion and directly connected to said accumulator;
   a first normally closed electromagnetic valve connected between said accumulator and both said second portion and said first actuating surface of each of said separating valves; and
   a second normally open electromagnetic valve connected between said return line and both said second portion and said first actuating surface of each of said separating valves;
   both said first and second electromagnetic valve being actuated by a wheel locking control signal to their other position to enable actuation of said second portion and said first actuating surface of each of said separating valves by the pressure from said accumulator to close each of said separating valves, to move said second and third portions against the pressure of said accumulator and to enable said first portion to provide volume expansion of said hydraulic fluid in each of said two brake circuits;
   said first, second and third portions returning to their normal conditions solely due to said pressure of said accumulator acting in said third portion when said wheel locking control signal disappears.

2. An anti-skid control device according to claim 1, further including
   a pressure medium duct between said third portion and said accumulator; and
   a non-return device connected in said duct.

3. An anti-skid control device according to claim 1, wherein said volume expansion device includes
   a cylindrical bore closed at both ends, said bore having a first length extending from one of said ends of said bore with a given diameter, a second length connected to said first length with a diameter greater than said given diameter and a third length connected to said second length extending to the other end of said bore with a diameter substantially equal to said given diameter,
   a cylindrical floating piston having a length shorter than said first length, a central portion slidably sealed to the inner surface of said first length, a first reduced diameter portion connected to one end of said central portion adjacent said one end of said bore and a second reduced diameter portion connected to the other end of said central portion,
   a cylindrical separating piston having a first cylindrical portion slidably sealed to the inner surface of said first length with one end thereof normally in contact with the adjacent end of said second reduced diameter portion and a second cylindrical portion slidably sealed to the inner surface of said second length, said second cylindrical portion being spaced from the end of said first length connected to said second length and the end of said second length connected to said third length, and
   a cylindrical actuating piston having a diameter equal to the diameter of said third length slidably sealed to the inner surface of said third length and a length extending from said second cylindrical portion to a point in said third length spaced from said other end of said bore,
   said first portion includes said floating piston, a first annular chamber formed by said first reduced diameter portion, said one end of said bore and the bore of a first part of said first length and a second annular chamber formed by said second reduced diameter portion, said one end of said first cylindrical portion and a second part of said first length,
   said second portion includes said separating piston and a third annular chamber formed by the end of said first length connected to said second length, said second cylindrical portion and the associated bore of said second length, and
   said third portion includes said actuating piston, a fourth annular chamber formed by the end of said second length connected to said third length, the part of said actuating piston in said second length, the end of said second cylindrical portion in contact with said actuating piston and the associated bore of said second length, and an actuating chamber formed by said other end of said bore, the end of said actuating piston adjacent said other end of said bore and the associated bore of said third length.

4. An anti-skid control device according to claim 3, wherein
   one of said two brake circuits is connected to said first chamber,
   the other of said two brake circuits is connected to said second chamber,
   said first actuating surface of one of said separating valves is connected to said third chamber and one of said electromagnetic valves, and
   said first actuating surface of the other of said separating valves is connected to said third chamber and the other of said electromagnetic valves.

5. An anti-skid control device according to claim 4, wherein
   said fourth chamber is directly connected to said return line, and
   said actuating chamber is directly connected to said accumulator.

6. An anti-skid control device according to claim 5, further including
   a pressure medium duct between said actuating chamber and said accumulator; and
   a non-return device connected in said cut.

7. An anti-skid control device according to claim 4, wherein said floating piston includes a second actuating surface disposed in said first chamber actuated by the pressure from said one of said two brake circuits and a third actuating surface disposed in said second chamber actuated by the pressure from said other of said two brake circuits, said second and third actuating surfaces having an equal size.

8. An anti-skid control device according to claim 3, wherein said second cylindrical portion includes a surface thereof disposed in said third chamber have a greater surface than the end of said actuating piston disposed in said actuating chamber.

9. An anti-skid control device according to claim 3, wherein said separating piston and said actuating piston are formed as a single unit.

10. An anti-skid control device according to claim 3, wherein said separating piston includes
    a sleeve slidably sealed in said second length, and
    a core slidably sealed to the inner surface of said sleeve and the inner surface of the bore of said first length, the end of said core within said first length being disposed within said second chamber which is connected to one of said two brake circuits.

11. An anti-skid control device according to claim 10, wherein
    said floating piston includes a longitudinal extension slidably contained within said core,
    a portion of said extension of said floating piston and a portion of said core providing an annular chamber therebetween in communication with said second chamber.

12. An anti-skid control device according to claim 10, wherein said sleeve includes a transverse portion in contact with an end of said actuating piston and an aperture in said transverse portion coaxial of the longitudinal axis of said bore.

13. An anti-skid control device according to claim 10, wherein said sleeve includes an annular surface adjacent said first length which constitutes an actuating surface for said separating piston disposed in said third chamber.

References Cited

UNITED STATES PATENTS

| 3,514,161 | 5/1970 | Frayer | 303—21 F |
| 3,524,683 | 8/1970 | Stelzer | 303—21 F |
| 3,610,702 | 10/1971 | MacDuff | 303—21 F |

MILTON BUCHLER, Primary Examiner

J. J. McLAUGHLIN, Assistant Examiner

U.S. Cl. X.R.

188—181 A; 303—10, 61